(12) United States Patent
Schon (10) Patent No.: US 8,485,091 B2
(45) Date of Patent: Jul. 16, 2013

(54) COOKING GRILL

(76) Inventor: Neal Schon, San Francisco, CA (US)

( * ) Notice: Subject to any disclaimer, the term of this patent is extended or adjusted under 35 U.S.C. 154(b) by 616 days.

(21) Appl. No.: 12/783,929

(22) Filed: May 20, 2010

(65) Prior Publication Data

US 2010/0300305 A1    Dec. 2, 2010

Related U.S. Application Data

(60) Provisional application No. 61/181,208, filed on May 26, 2009.

(51) Int. Cl.
*A47J 37/10* (2006.01)

(52) U.S. Cl.
USPC .................. 99/339; 99/340; 99/372; 99/377; 99/379

(58) Field of Classification Search
USPC .................. 99/372, 374, 375, 376, 377, 378, 99/379, 390, 393
See application file for complete search history.

(56) References Cited

U.S. PATENT DOCUMENTS

| | | | | | |
|---|---|---|---|---|---|
| 2,225,176 | A | * | 12/1940 | Lewis et al. | 99/372 |
| 3,223,025 | A | * | 12/1965 | Johns | 99/377 |
| 3,463,076 | A | * | 8/1969 | Keating | 99/349 |
| 4,766,880 | A | * | 8/1988 | von Blanquet | 126/299 D |
| 5,793,021 | A | * | 8/1998 | Walton | 219/443.1 |
| 6,415,710 | B1 | * | 7/2002 | Boone | 99/446 |
| 7,021,308 | B2 | * | 4/2006 | Caruso | 126/211 |
| 2006/0144253 | A1 | * | 7/2006 | Czajka et al. | 99/446 |

* cited by examiner

*Primary Examiner* — Reginald L Alexander
(74) *Attorney, Agent, or Firm* — Dergosits & Noah LLP; Todd A. Noah (57) ABSTRACT

A cook top includes a lower grill and an upper grilling unit that is mounted adjacent to a back edge of the lower grill. The upper grill unit can be moved from a recessed position at a back edge of the cook top to a raised vertical position by a raising mechanism. From the raised position, the upper grilling unit can be rotated forward so that food placed on the lower grill can also be cooked by the upper grilling unit.

16 Claims, 9 Drawing Sheets

142 # COOKING GRILL

CROSS REFERENCE TO RELATED APPLICATIONS

This application claims priority to U.S. Provisional Patent Application No. 61/181,208, Gas Grill, filed May 26, 2009 and is hereby incorporated in its entirety by reference.

FIELD

The invention is directed towards a grill for cooking food.

BACKGROUND

A cook top is a kitchen appliance designed for the purpose of cooking food. Cook tops have burners that provide direct heat for the cooking process. The cook top may also be part of a range that includes an oven, used for baking. Natural gas and electric cook top burners are the most common today in western countries. Both are equally mature and safe, and the choice between the two is largely a matter of personal preference and preexisting utility outlets. Professional chefs often prefer gas cook top burners that allow control of the heat more finely and more quickly.

DETAILED DESCRIPTION

Figure 1:
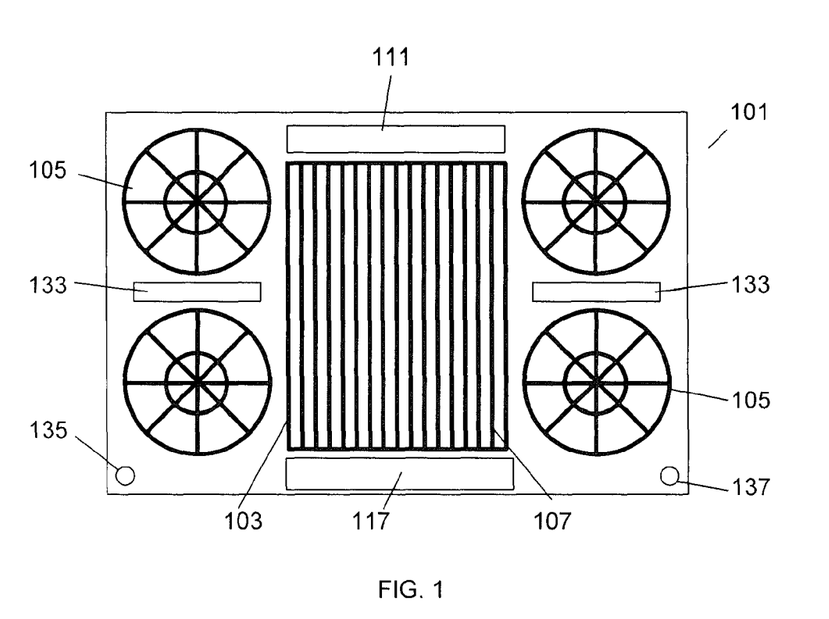
FIG. 1 illustrates a top view of an embodiment of the cook top.

The present invention is directed towards a cook top that has an incorporated double sided grill. With reference to FIG. 1, a top view of an embodiment of the inventive cook top 101 is illustrated. The cook top 101 includes a grill 103 in the center portion. The grill can be heated by electricity or gas. The grill 103 can include a grate having a plurality of raised metal surfaces 107. The grate is heated to a desired temperature and the food to be cooked is placed on the grate 107. Heat flows through the grate 107 to the food. Heat from the grill 103 can also heat the air between the grate 107 and the food can be cooked by convection.

The grill 103 also includes an upper surface grilling unit 111 that is stored in a recessed area when not being used. The upper surface grilling unit 111 can be used to apply direct heat to the upper surfaces of the food placed on the grill 103. This feature will be described in more detail later.

The cook top 101 may also include an upper grill control button 137 for extending the upper grilling unit 131. When the control button 137 is actuated, the upper grilling unit 111 can extend upward from its recessed storage space so that it can be used to cook the upper surface of the food on the grill 103. In an embodiment, the upper grilling unit 111 cannot be heated until it is raised from the recessed storage space. This prevents accidentally heating the upper grilling unit 111 when it is not being used.

Figure 2:
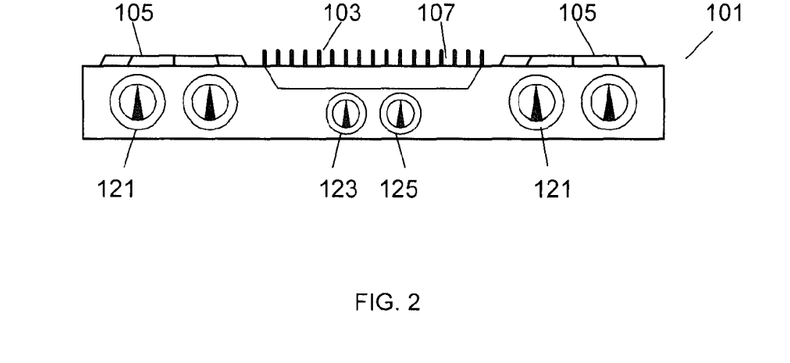
FIG. 2 illustrates a front view of an embodiment of the cook top.

With reference to FIG. 2, a front view of the cook top 101 is illustrated. There are cook top controls 121, an upper grill control 123 and a lower grill control 125. By rotating the cook top controls 121, the heat applied to the burners 105 can be controlled. There may be one cook top control 121 for each of the burners 105. The lower grill control 125 can control the heat applied to the lower grill 103 and the upper grill control 123 can control the heat applied to the upper surface grilling unit 111. In an embodiment, the controls may have an off position with the arrows facing up. The heat produced by the burners and grills can be controlled by rotating the controls 121, 123, 125 away from the off position.

Figure 3:
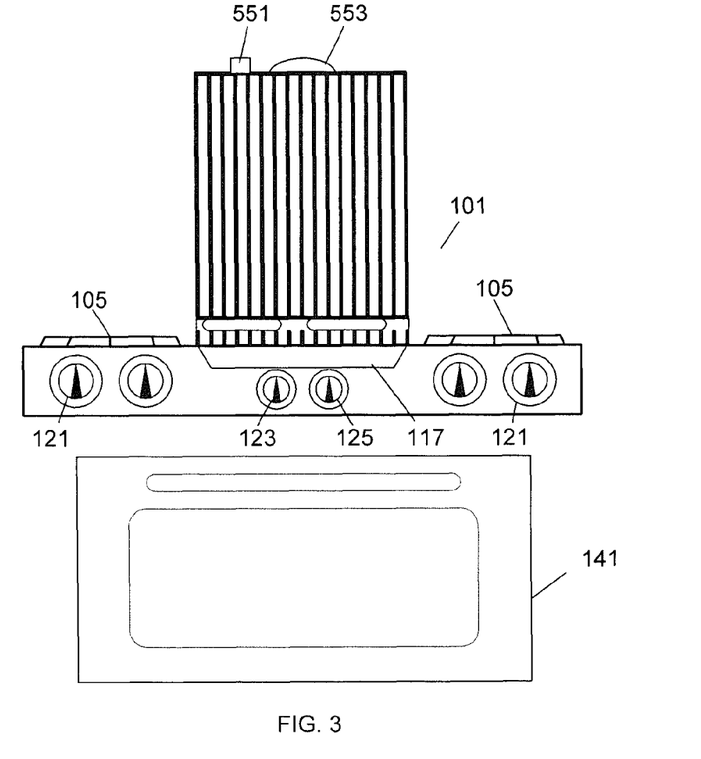
FIG. 3 illustrates a front view of an embodiment of the cook top with the upper grilling unit raised.

With reference to FIG. 3, a front view of the cook top 101 is illustrated with the upper grilling unit 111 extended. As discussed, when the control button 137 is actuated the upper grilling unit 111 can be raised from the recessed storage area. The upper grilling unit 111 can have a cooking surface that is substantially the same size as the grill 103 and the upper grilling unit 111 can include a grill 133 that may have a pattern of raised cooking surfaces that matches the raised cooking surfaces of the lower grill 103. In a preferred embodiment, the upper grilling unit 111 is heated by electrical power. A resistive heating element can be mounted within the upper grilling unit 111 and the heat generated by the upper grilling unit can be controlled by the upper grill control 123. An oven 141 can be mounted in a structure below the cook top 101. In other embodiments, a warming drawer, a microwave or any other appliance can be mounted under the cook top 101.

Figure 4:
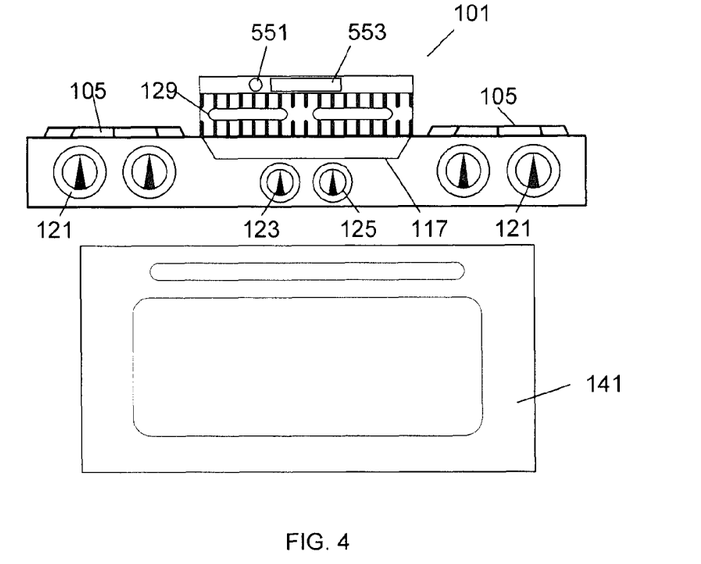
FIG. 4 illustrates a front view of an embodiment of the cook top with the upper grilling unit cooking the upper surface of food.
Figure 5:
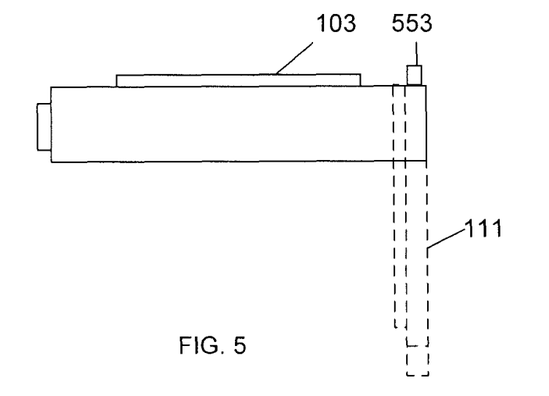
FIG. 5, illustrates a side view of an embodiment of the cook top with the upper grilling unit recessed.
Figure 6:
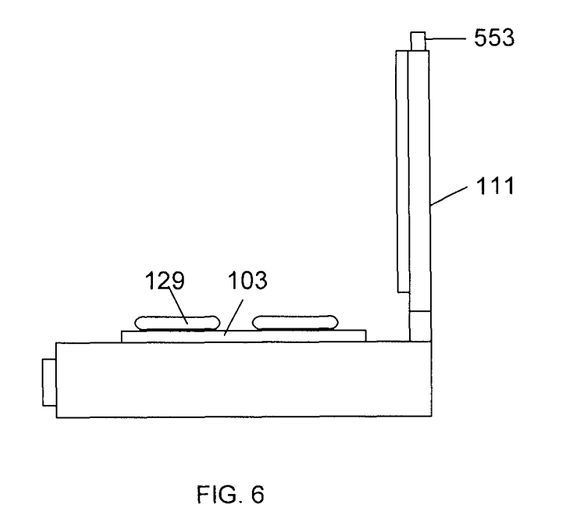
FIG. 6 illustrates a side view of an embodiment of the cook top with the upper grilling unit raised.
Figure 7:
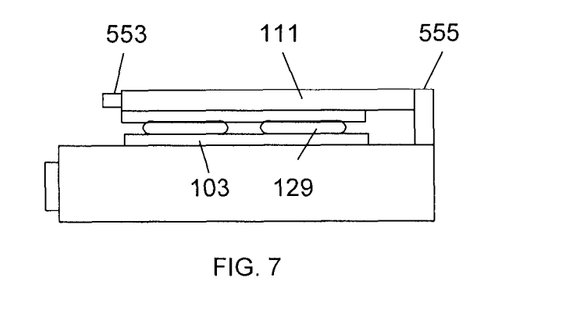
FIG. 7 illustrates a side view of an embodiment of the cook top with the upper grilling unit cooking the upper surface of food.

With reference to FIG. 4, food 129 can be placed on the lower grill 103 and the upper grilling unit 111 can be rotated so that the heated upper grill 133 contacts the upper surface of the food 129. Thus, the upper and lower surfaces of the food 129 can be cooked simultaneously. With reference to FIGS. 5-7, side views of the cook top 101 are illustrated. In FIG. 5, the upper grilling unit 111 is in its recessed position. FIG. 5 corresponds with the front view of FIG. 2. With reference to FIG. 6, the upper grilling unit 111 has been extended from the recessed position and food 129 has been placed on the lower grill 103. FIG. 6 corresponds with the front view of FIG. 3. With reference to FIG. 7, the upper grilling unit 111 is rotated forward about a hinge 555 or flexible joint so that the upper grill 133 contacts and cooks the upper surfaces of the food 129. FIG. 7 corresponds with the front view of FIG. 4. In an embodiment, the hinge 555 or flexible joint can have a dampening or rotation resistance mechanism which prevents the upper grilling unit 111 from falling on the lower grill 103. In other embodiments, the upper grilling unit 111 may have a handle 553 and a control button 551 (shown in FIGS. 3-7) that can be used to release the hinge 555 or flexible joint. The user may hold the handle 553 and push the control button 551 to release the hinge 555 or flexible joint. Thus, the rotation of the upper grilling unit 111 will be controlled.

Figure 8:
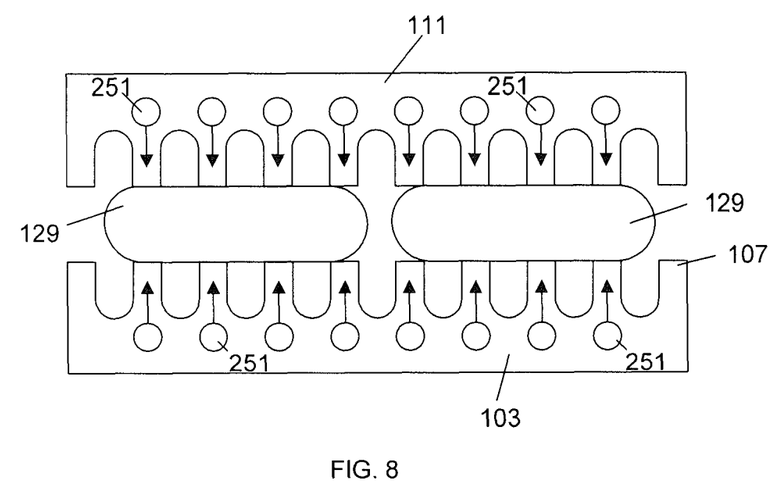
FIGS. 8 and 9 illustrate cross section views of an embodiment of the grill having an electrical upper grilling unit and an electrical lower grill.
Figure 9:
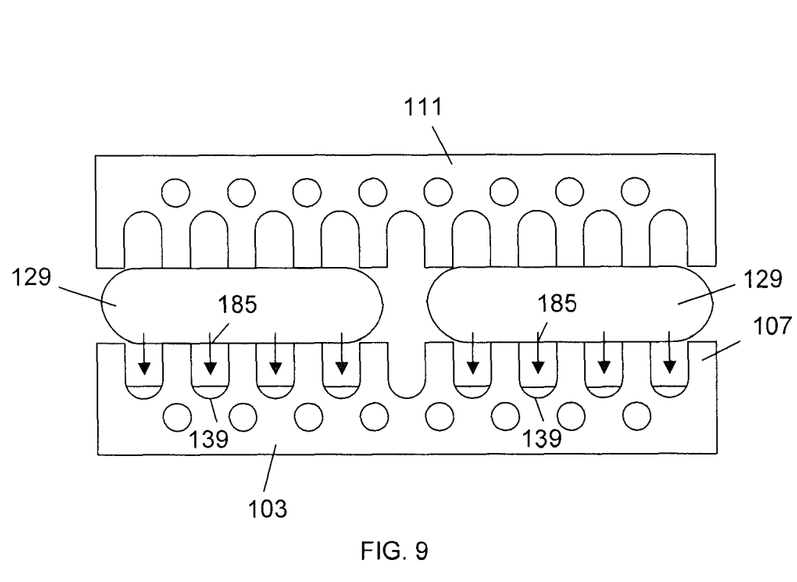

With reference to FIG. 8, a cross section view of the upper electric grilling unit 111 and the lower electric grill 103 is illustrated. In this embodiment, the upper grilling unit 111 and the lower grill 103 both include electrically powered heating elements 251 that are mounted within structures. Heat produced by the heating elements 251 is conducted through the upper grill 133 and the lower grill 103 to the food 129. With reference to FIG. 9, fluids 185 including fat and water from the food 129 can drip down into the channels 139 between the grate 107. In an embodiment, the channels 139 slope forward so that the fluids 185 can flow forward out of the grate 103 into a grease trap (not shown).

Figure 10:
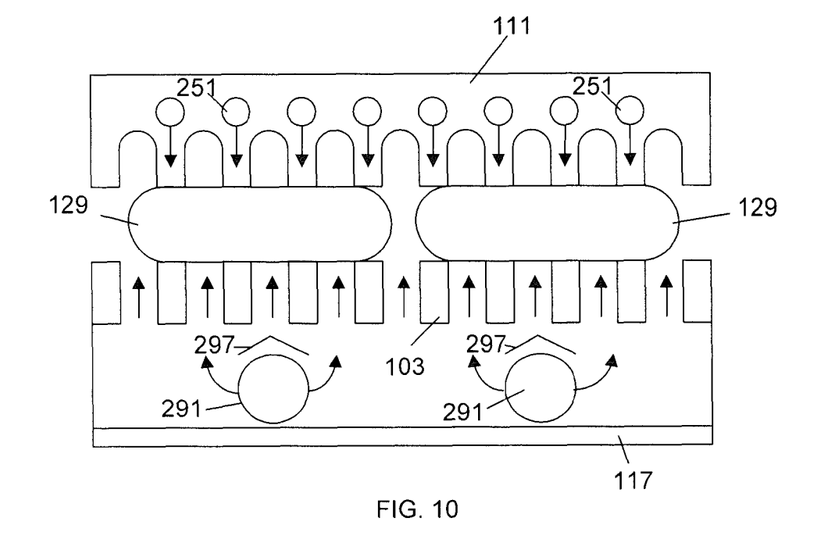
FIGS. 10 and 11 illustrate cross section views of an embodiment of the grill having an electrical upper grilling unit and a gas lower grill.

With reference to FIG. 10, a cross section view of the upper electric grilling unit 111 and the lower gas grill 103 is illustrated. In this embodiment, the upper grilling unit 111 includes electrically powered heating elements 251 and the lower grill 103 is heated by gas burners 291 that are mounted under the grill 103. The gas burners 291 can be hollow structures that have a plurality of holes on each side of the burners 291. Gas flowing through the burners 291 flow out of the side holes and are ignited. The flames produce heat that travels between the grate 103 to the food 129 and heats the grate 103. Thus, the food 129 is cooked by conductive heat from the grate 103 as well as convection heat from the hot gases emitted by the burners 291.

Figure 11:
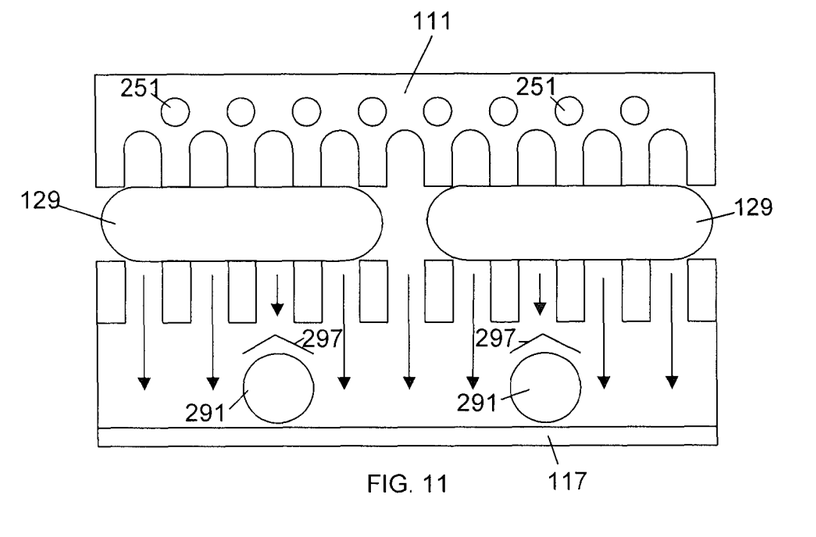
Figure 12:
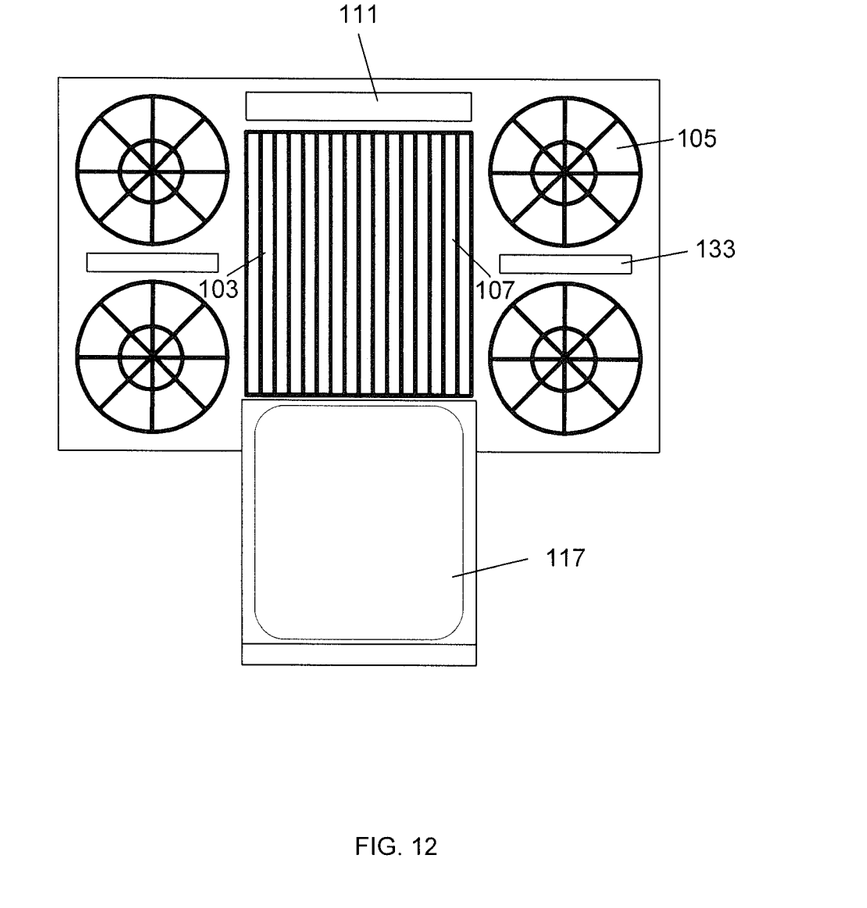
FIG. 12 illustrates a top view of the cook top with the grease trap extended for cleaning.

With reference to FIG. 11, fluids 185 including fat and water from the food 129 can drip down into the grate 103 to a grease tray 117 under the burners 291. Covers 297 can be mounted over the burners 291 to protect the burners from the fluids dripping from the food 129. With reference to FIG. 12, in an embodiment, the grease tray 117 can slide forward out of the cook top 101 and be removed for cleaning.

Figure 13:
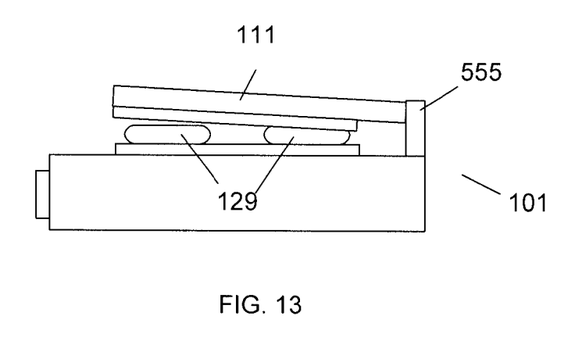
FIGS. 13 and 14 illustrate side views of the cook top.

With reference to FIG. 13, a potential problem with a single simple hinge 555 connecting the upper grilling unit 111 to the cook top 101 is that it may not contact the food 129 evenly. For example, if the food 129 placed by the back edge of the grill 103 is too thick, the upper grilling unit will compress the food 129 closest to the hinge and may not be able to contact the other food 129 placed towards the front of the grill 103. This can result in some of the food 129 being crushed by the upper grilling unit 111 and some of the food 129 not being in contact with the upper grilling unit 111.

Figure 14:
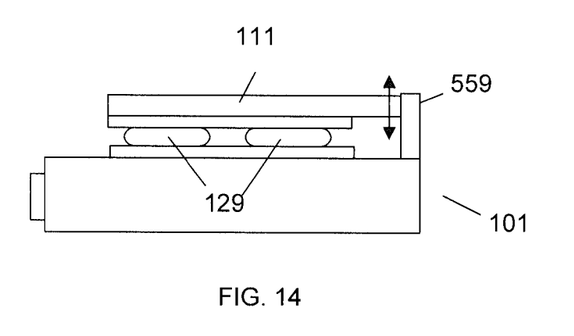
Figure 15:
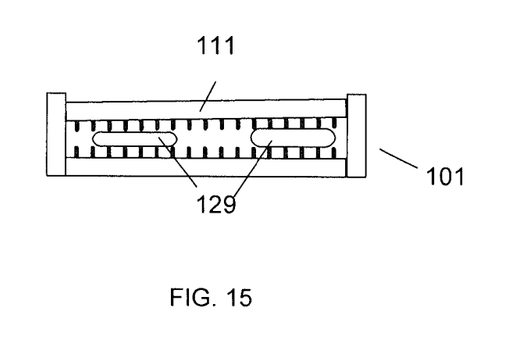
FIG. 15 illustrates a back view of the upper grilling unit and lower grill.

In order to solve this problem, a movable hinge 559 may be mounted on either side of the upper grilling unit 111. Each hinge 559 can rotate like a normal hinge and may also be able to move vertically. Thus, the upper grilling unit 111 can be placed at any angle over the different size food 129 on the grill 103. For example, with reference to FIG. 14, the upper grilling unit 111 can be adjusted to evenly cook all of the thicker food 129 placed on the grill 103. With reference to FIG. 15, a back view of the grill 101 is illustrated. The food 129 on the right side is thicker than the food 129 on the left side. However, because the movable hinges 559 can move vertically, the upper grilling unit 111 can be angled so that there is contact with both the thicker food 129 and thinner food 129.

Figure 16:
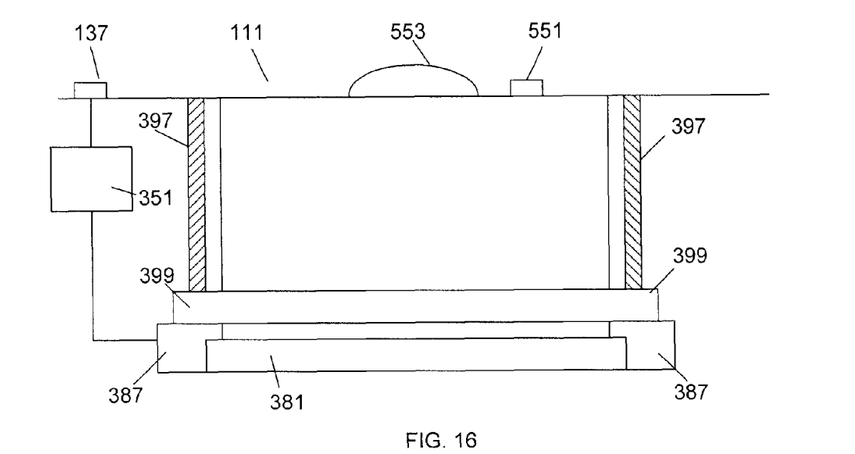
FIGS. 16 and 17 illustrate back views of an embodiment of the upper grilling unit and motor mechanism.

With reference to FIG. 16, a detailed view of the upper grilling unit 111 in the recessed position is illustrated. In an embodiment, an electric motor unit or motor units 387 are controlled by a controller 351 used to raise the upper grilling unit 111 between a raised position and a recessed storage position. The motor units 387 can be coupled to threaded rods 397 that are surrounded by threaded sleeves 399 that are coupled to the upper grilling unit 111. The controller 351 can be coupled to the control button 137. The motor unit(s) 387 may be stepper motors that can be controlled to rotate a specific number of revolutions. For example, it may require 100 rotations to move the threaded sleeves 399 from the bottom to the top of the threaded rods 397. The controller 351 can instruct the motor units 387 to rotate 100 revolutions in one direction and then stop to raise the upper grilling unit 111 and conversely rotate 100 revolutions in the opposite direction to lower the upper grilling unit 111. The recessed position is below the surface of the cook top 101 so that the upper grilling unit 111 is not fully visible. A second grease tray 381 can be mounted under the bottom edge of the upper grilling unit 111 so that residual cooking fluids can be trapped. The second grease tray 381 can be removed and cleaned.

Figure 17:
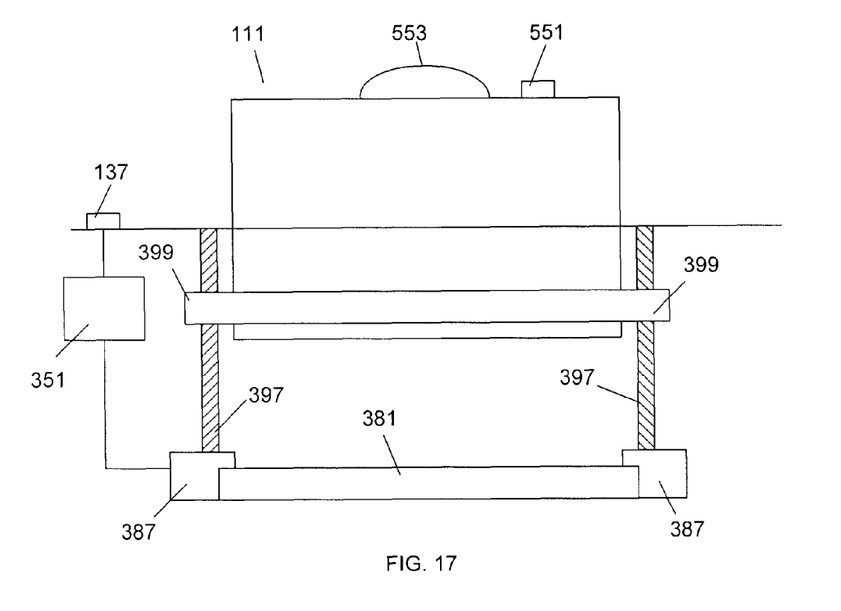
Figure 18:
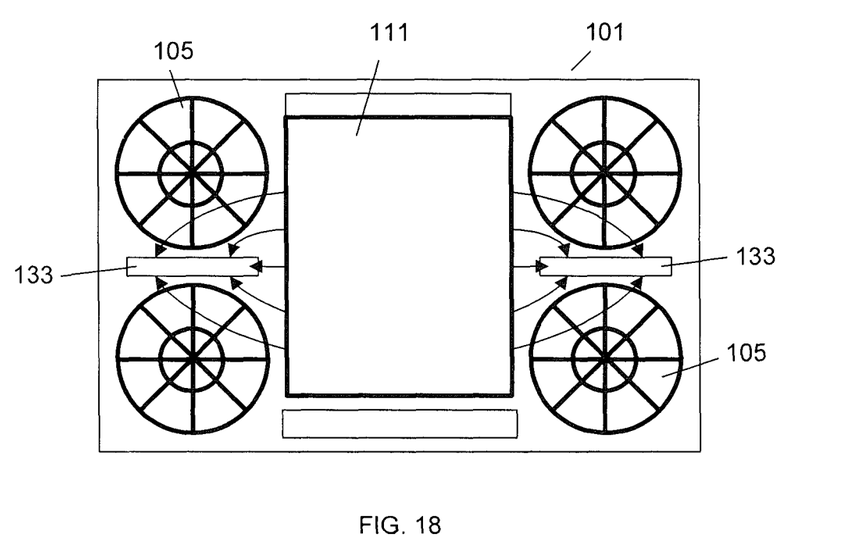
FIG. 18 illustrates a top view of an embodiment of the cook top with down draft vents operating.

With reference to FIG. 17, when the motor units 387 rotate the threaded rods 397, the threaded sleeves 399 move up the threaded rods 397 and the upper grilling unit 111 is raised. The movement can stop after the threaded sleeves 399 reach the tops of the threaded rods 397. The upper grilling unit 111 can then be used as described above.

With reference back to FIGS. 1-4, in an embodiment, the cook top 101 can also include a plurality of burners 105 that are used to heat pots and pans that contain food. There are various types of burners that can be used with the grill. The burners can be powered by a flammable gas such as natural gas, propane, etc. A control can be used to vary the amount of gas flowing to the burner. More gas flow will produce a bigger flame. By adjusting the gas flow, the heat applied to the burner can be controlled. In other embodiments, the burners can be electrical heating elements. Resistive heating coils are made of a conductive electrically resistant material. A voltage is applied to the ends of the coil and the coils convert electrical current into heat. By controlling the current, the heat emitted by the heating coils can be controlled. In an embodiment the burners can be induction cookers that cause metal vessels to be heated by electromagnetic induction.

Figure 19:
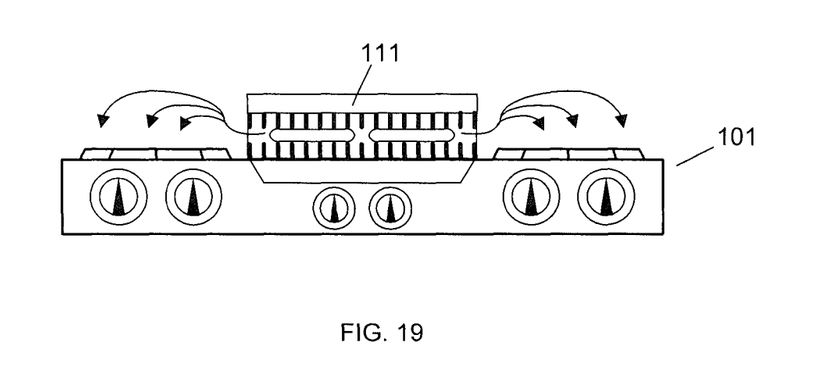
FIG. 19 illustrates a side view of an embodiment of the cook top with down draft vents operating.

With reference to FIG. 19, the cook top 101 can include down draft vents 133 and vent controls 135. When the vents 133 are actuated, fans within the cook top 101 are actuated creating a vacuum which can remove air from the cook top 101 area. When the vent controls 135 are actuated, the vents 133 can suck air, odor and gases from the cook top area. The vented air can be transported through ducts to the exterior of the building. In different embodiments, the running rate of the vents 133 can be variable and the vents may have low, medium and high settings. The vents 133 may also be controlled independently.

With reference to FIG. 8, a top view of the cook top 101 is illustrated with the down draft vents 133 running. In this embodiment the vents 133 are elongated slots that extend between the adjacent burners 105. Gas and vapor from the cooking food is sucked into the down draft vents 133 from the sides of the grill 103 and upper grilling unit 111. With reference to FIG. 9, a front view of the cook top 101 is illustrated showing the gas and vapor flow paths from the sides of the grill 103 and upper grilling unit 111 to the downdraft vents 133. In other embodiments, various other down draft vent positions are possible.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A cook top comprising:
a lower grilling unit fixed on a surface of the cook top;
a recessed storage area adjacent a back edge of the lower grilling unit;
an upper grilling unit removably stored in the recessed storage area;
a raising mechanism coupled to the upper grilling unit and adapted to move the upper grilling unit in and out of the recessed storage area; and
a hinge mechanism coupled to the upper grilling unit and adapted to rotate the upper grilling unit into a use position above and substantially parallel to the lower grilling unit, wherein the hinge mechanism is further adapted to dampen the rotation of the upper grilling unit in order to prevent free movement of the upper grilling unit.

2. The cook top of claim 1, the raising mechanism further comprising:
an electric motor coupled to the upper grilling unit; and
a controller coupled to the electric motor, the controller configured to drive the electric motor in order to raise and lower the upper grilling unit from the storage area.

3. The cook top of claim 1, the raising mechanism further comprising:
a threaded sleeve coupled to the upper grilling unit; and
a threaded rod coupled to the threaded sleeve and to the electric motor, wherein the electric motor is operable via the controller to drive the threaded rod up and down to thereby raise and lower the upper grilling unit from the storage area.

4. The cook top of claim 1, wherein the hinge mechanism comprises a pair of hinge mechanisms, each hinge mechanism coupled to opposite sides of a leading edge of the upper grilling unit.

5. The cook top of claim 4, the hinge mechanism further adapted to provide a limited range of vertical movement such that the upper grilling unit can be positioned at an angle relative to the lower grilling unit in order to accommodate different food thicknesses.

6. The cook top of claim 1, wherein the upper grilling unit is substantially the same size as the lower grilling unit.

7. The cook top of claim 1, wherein the upper grilling unit and the lower grilling unit have matching raised cooking surfaces.

8. A cook top comprising:
a lower grilling unit fixed on a surface of the cook top;
a recessed storage area adjacent a back edge of the lower grilling unit;
an upper grilling unit removably stored in the recessed storage area;
a raising mechanism coupled to the upper grilling unit and adapted to move the upper grilling unit in and out of the recessed storage area;
a hinge mechanism coupled to the upper grilling unit and adapted to rotate the upper grilling unit into a use position above and substantially parallel to the lower grilling unit, wherein the hinge mechanism is further adapted to dampen the rotation of the upper grilling unit in order to prevent free movement of the upper grilling unit;
a first down draft vent mounted on a left side of the lower grilling unit; and
a second down draft vent mounted on a right side of the lower grilling unit.

9. The cook top of claim 8, the raising mechanism further comprising:
an electric motor coupled to the upper grilling unit; and
a controller coupled to the electric motor, the controller configured to drive the electric motor in order to raise and lower the upper grilling unit from the storage area.

10. The cook top of claim 9, the raising mechanism further comprising:
a threaded sleeve coupled to the upper grilling unit; and
a threaded rod coupled to the threaded sleeve and to the electric motor, wherein the electric motor is operable via the controller to drive the threaded rod up and down to thereby raise and lower the upper grilling unit from the storage area.

11. The cook top of claim 8, wherein the hinge mechanism comprises a pair of hinge mechanisms, each hinge mechanism coupled to opposite sides of a leading edge of the upper grilling unit.

12. The cook top of claim 11, the hinge mechanism further adapted to provide a limited range of vertical movement such that the upper grilling unit can be positioned at an angle relative to the lower grilling unit in order to accommodate different food thicknesses.

13. The cook top of claim 8, wherein the upper grilling unit is substantially the same size as the lower grilling unit.

14. The cook top of claim 8, wherein the upper grilling unit and the lower grilling unit have matching raised cooking surfaces.

15. A cooking grill comprising:
a first grilling unit fixed on a surface of the cooking grill;
a second grilling unit removably stored adjacent the first grilling unit;
a raising mechanism coupled to the second grilling unit and adapted to move the second grilling unit in and out of a recessed storage area adjacent the first grilling unit; and
a hinge mechanism coupled to the second grilling unit and adapted to rotate the second grilling unit into a use position above and substantially parallel to the first grilling unit;
the raising mechanism further comprising:
a threaded sleeve coupled to the second grilling unit;
a threaded rod coupled to the threaded sleeve and to an electric motor; and
a controller coupled to the electric motor, the controller configured to operate the electric motor and drive the threaded rod up and down thereby raising and lowering the second grilling unit from the storage area.

16. The cooking grill of claim 15, the hinge mechanism further adapted to provide a limited range of vertical movement such that the second grilling unit can be positioned at an angle relative to the first grilling unit in order to accommodate different food thicknesses.

* * * * *